(No Model.)
G. L. JARRETT & J. P. BOWER.
REVERSIBLE DRIVING GEAR FOR CONVEYERS.
No. 393,762. Patented Dec. 4, 1888.
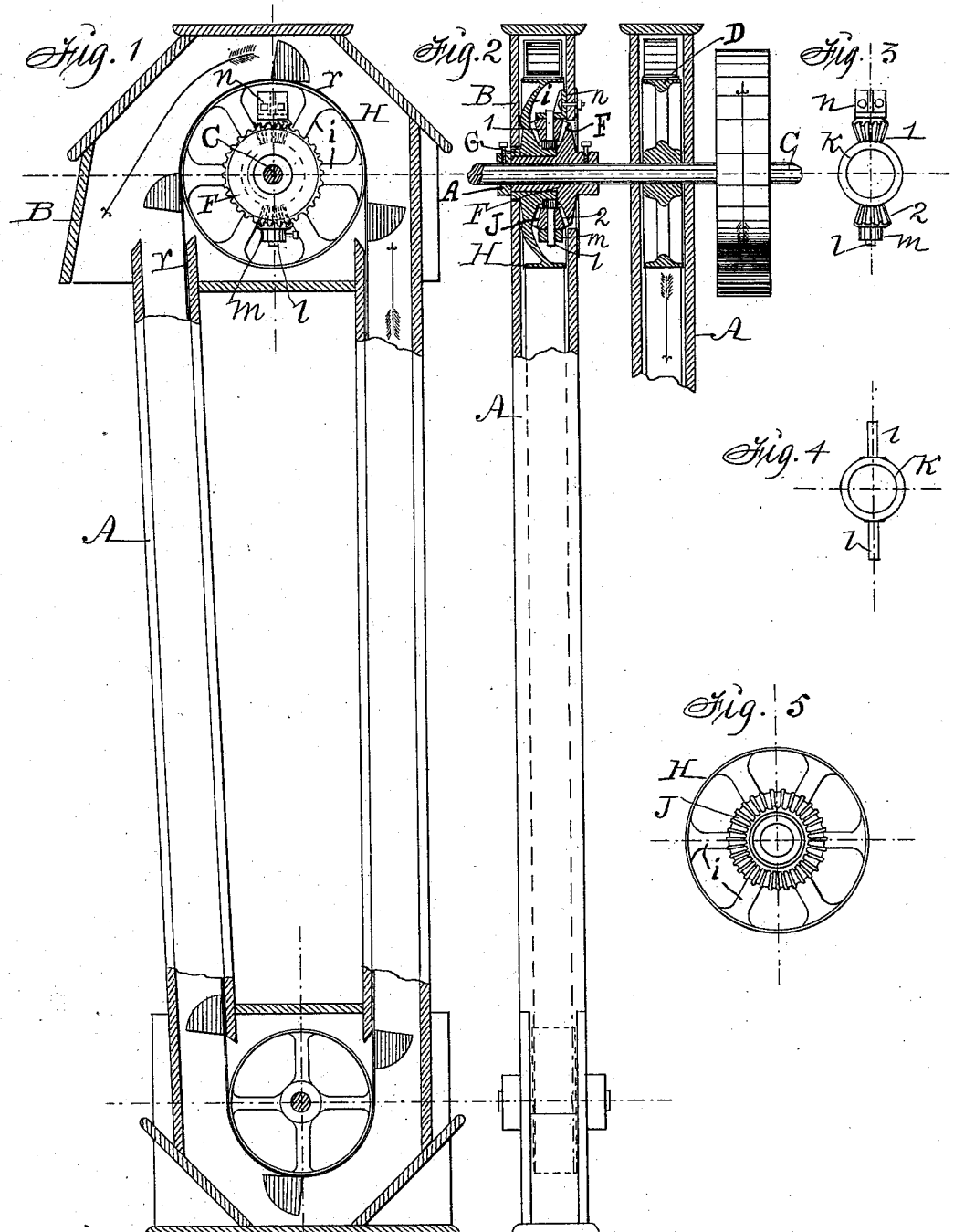

UNITED STATES PATENT OFFICE.

GEORGE L. JARRETT AND JOSEPH P. BOWER, OF DES MOINES, IOWA.

REVERSIBLE DRIVING-GEAR FOR CONVEYERS.

SPECIFICATION forming part of Letters Patent No. 393,762, dated December 4, 1888.

Application filed April 14, 1888. Serial No. 270,676. (No model.)

*To all whom it may concern:*

Be it known that we, GEORGE L. JARRETT and JOSEPH P. BOWER, citizens of the United States of America, residing at Des Moines, Iowa, have invented a new and useful Improvement in Reversible Driving-Gear for Conveyers in Mills, &c., of which the following is a specification.

Our object is to combine two or more reversible driving-pulleys and endless carriers with one driving-shaft in such a manner that such conveyers will be simultaneously operated in reverse ways, as required, to discharge matter in opposite directions relative to the shaft, and conveyers, hoppers, and bins that may be located on opposite sides of the same shaft.

Our invention consists in the construction and combination of driving-gear for reversing the motion of a loose pulley relative to a fixed pulley on the same shaft, as hereinafter set forth, pointed out in our claim, and illustrated in the accompanying drawings, in which—

Figure 1 is a side view of conveyers having parts broken away to show the construction, application, and operation of our loose pulley and mechanism for operating it. Fig. 2 is a sectional view showing our loose pulley and also a common fixed pulley on one driving-shaft, as required for practical use. Fig. 3 shows a collar provided with journals and bevel-gears placed upon said journals. Fig. 4 shows the same collar without the gear-wheels. Fig. 5 is a face view of the loose pulley having an integral bevel-gear adapted to engage the pinions or wheels on the journals of the collar.

A represents the body or case, and B the cap or head, of a conveyer of common form.

C is a rotating shaft in a horizontal position. D is a pulley, of common form, fixed to the shaft C within the top portion of a conveyer's case, to operate an endless carrier in a common way.

F is a bevel-wheel that has an elongated hub fixed on the shaft C and within the conveyer's case. A collar is fixed on the shaft on the outside of the case, as shown in Fig. 2, or in any suitable way.

G is the hub of our loose pulley, H the rim, and *i* the arms or spokes that connect the rim and hub.

J is a miter-gear formed integral with the spokes and hub and rim.

*k* is a collar fitted on the end of the hub G, and provided with journals *l*, that extend outward in the same plane and in opposite directions.

1 and 2 are miter gear-pinions placed on the journals *l* to engage the wheels F and J. A nut or collar, *m*, on the lower journal retains pinion 1 in place, and a bearing, *n*, fixed to the inside of the case, retains pinion 2 on the journal that extends upward from the collar *k*. One pinion will suffice, but two are preferably used.

*r* is an endless belt of a carrier to which cups *s* are fixed in a common way.

In the practical operation of our invention, when the shaft C is rotated, the fixed pulley D and the endless carrier thereon will revolve in the same direction that the shaft does. The bevel-wheel F will also revolve in the same direction, and the pinions 1 and 2 will transmit motion therefrom to the combined wheel and loose pulley G H and rotate it in the opposite direction of the motion of the shaft C and fixed pulley D, so that the carrier on the loose pulley and the carrier on the fixed pulley will be simultaneously operated in reverse ways, as required, to empty their contents on the opposite sides of the shaft. Any number of fixed and loose pulleys and conveyers may be thus connected with one shaft to facilitate the movement of grain in various directions at the same time.

We claim as our invention—

The bevel-gear F, the loose pulley composed of the hub G, rim H, and bevel-gear J, the collar *k*, having journals *l*, and the pinions 1 and 2, combined with the shaft C, and the bearing *n*, fixed to a conveyer-case, to operate in the manner set forth, for the purposes stated.

GEORGE L. JARRETT.
JOSEPH P. BOWER.

Witnesses for George L. Jarrett:
  M. P. SMITH,
  THOMAS G. ORWIG.

Witnesses for Joseph P. Bower:
  J. T. ROOD,
  J. S. FELKER.